United States Patent [19]

Sanyasi

[11] Patent Number: 5,753,717
[45] Date of Patent: May 19, 1998

[54] PLASTICS FOAM AND METHOD OF MANUFACTURING SAME

[75] Inventor: Graham Ramlu Sanyasi, Victoria, Australia

[73] Assignee: ACI Operations Pty Ltd., Melbourne, Australia

[21] Appl. No.: 401,926

[22] Filed: Mar. 9, 1995

Related U.S. Application Data

[63] Continuation-in-part of Ser. No. 220,297, Mar. 30, 1994, abandoned.

[51] Int. Cl.$^6$ ............................................. C08J 9/30
[52] U.S. Cl. ................... 521/74; 521/75; 521/79; 521/80; 264/45.8; 264/45.9; 264/46.2; 264/46.3; 264/50; 264/51; 264/54
[58] Field of Search ............. 264/50, 45.8, 45.9, 264/46.2, 46.3, 50.51, 54; 521/74, 94, 79, 80, 75

[56] References Cited

U.S. PATENT DOCUMENTS

| | | |
|---|---|---|
| 3,830,901 | 8/1974 | Winstead . |
| 4,344,710 | 8/1982 | Johnson et al. . |
| 4,424,287 | 1/1984 | Johnson et al. . |
| 4,436,679 | 3/1984 | Winstead . |
| 4,470,938 | 9/1984 | Johnson . |
| 4,473,665 | 9/1984 | Martini-Wedensky et al. . |
| 5,250,577 | 10/1993 | Welsh . |
| 5,266,605 | 11/1993 | Welsh . |
| 5,286,429 | 2/1994 | Blythe et al. . |
| 5,332,761 | 7/1994 | Paquet et al. . |

FOREIGN PATENT DOCUMENTS

| | | |
|---|---|---|
| 5272479 | 12/1979 | Australia . |
| 5272479 | 5/1980 | Australia . |
| 9010091 | 2/1992 | Australia . |
| 438708 | 7/1991 | European Pat. Off. . |
| 464581 | 8/1992 | European Pat. Off. . |
| 9417133 | 4/1994 | WIPO . |
| 9414881 | 7/1994 | WIPO . |

OTHER PUBLICATIONS

International Search Report; in connection with PCT/AU95/00127; Dated Jun. 14, 1995.
International Preliminary Examination Report; in connection with PCT/AU95/00127.
Japanese Patent No. 49703/99; Issued 20 Jun. 1974, to Sekisui.

*Primary Examiner*—Duc Truong
*Attorney, Agent, or Firm*—Hovey,Williams, Timmons & Collins

[57] ABSTRACT

A method of producing an extruded plastics foam of enhanced physical strength includes intimately mixing a blowing agent incorporation $CO_2$, the major portion of which is a natural gas, in a plastics resin melt to form a homogenous resin mix, and extruding the resin mix through an exit die into a region of lower pressure. At the point of extrusion out of the exit die, the temperature of the resin mix is adjusted so that it is below the critical temperature.

19 Claims, 2 Drawing Sheets

PLASTICS FOAM AND METHOD OF MANUFACTURING SAME

RELATED APPLICATIONS

The present application is a Continuation-in-Part of Ser. No. 08/220,297, filed 30 Mar. 1994, now abandoned.

This invention relates to the production of a plastics foam which is formed utilising a non-fluorocarbon blowing agent. The description of the invention hereinafter generally refers to the use of carbon dioxide alone as the blowing agent. This is only because this is the preferred agent. Other natural gases can be used with $CO_2$ such as nitrogen, air and water.

Until recently the favoured agents for use in the generation of plastics extruded foams, have been fluorocarbons such as dichlorofluoromethane and trichlorofluoromethane. In recent times, however, there has been substantial movement away from the use of such compounds as some scientific studies have indicated that fluorocarbons when released into the atmosphere may have damaging consequences, in particular to the ozone layer. Alternative technologies have been developed utilising natural gases as blowing agents such as carbon dioxide and an example can be found in U.S. Pat. No. 4,436,679.

However, there have been very few, if any commercial operations reported using $CO_2$ as the sole blowing agent in the manufacture of polystyrene foam using molten polystyrene. Most commercial operations using $CO_2$ as a blowing agent use $CO_2$ in combination with a hydrocarbon blowing agent such as pentane or butane or with a fluorocarbon product such as Du Pont 152A. It is an object of the present invention to produce a foam using a $CO_2$ or $CO_2$ containing blowing agent.

Preferably the foam produced should have characteristics and properties at least as good as a fluorocarbon blown foam. Most preferably the foam produced will have an average cell diameter below 22 microns, a cell wall thickness below 4 microns, a density between 1.5 to 3.0 lbs/ft$^3$ and cells which are substantially uniformly oriented in all three dimensions.

Hitherto, it has been considered that plastic foams such as polystyrene foams when blown using a natural gas should incorporate a fairly low molar amount of the blowing agent entrained in the resin. It has been previously considered that generally as the proportion of blowing agent is increased the density of the foam is decreased and that the physical strength of the foam decreases with the density. For example polystyrene foams produced using above about 0.1 moles blowing agent per 100 g of polystyrene have generally been considered to be too weak to be of commercial value, particularly when the foam is intended for use in making an end product such as a tray or other supporting substrate. It has also been previously considered that the control of the foaming process is more difficult as the proportion of blowing agent is increased. Most examples previously published suggest the use of a proportion of $CO_2$ (when making a polystyrene foam) in the range 1.5–3.0% by weight (0.034–0.068 moles $CO_2$/100 g polystyrene).

These previously made foams have been extruded at a stock at die temperature of about 140° to 155° C. It has also been found with these foams that if they are extruded at the bottom end of this temperature range they have a tendency to shrink immediately after manufacture. This is probably due to the rapid diffusion of $CO_2$ out of the cells causing a partial vacuum in the cells. Shrinkage may be controlled by increasing the stock at die temperature or by decreasing the $CO_2$ concentration.

SUMMARY OF THE INVENTION

Notwithstanding the accepted wisdom concerning the appropriate level of blowing agent addition the applicant through a series of trials using higher levels of natural gas blowing agent addition has ascertained that the blowing agent if it incorporates $CO_2$ can act as a viscosity modifier of the resin (this has various ramifications as hereinafter described) and also that the temperature at which the plastic/blowing agent mix is extruded is critical to the strength of the resulting foam.

It has generally been considered that the temperature of foaming is not particularly important. For polystyrene a temperature range from 155° C. to 135° C. has been quoted in the literature, but actual examples of $CO_2$ blown foams have all been limited to above at least 140° C. In fact the scant regard to the temperature of the material at the exit die in the prior art highlights the fact that it has not previously been appreciated how important this parameter is in the production of strong foams. The temperature of the stock varies considerably at or near the exit die but there has not previously been any emphasis on the manner of measurement of the temperature or exactly how it is to be measured. The only benefit of lowering the temperature previously reported has been to increase control over the forming process to avoid surface defects in the formed sheet. In general, reduction of temperature has not been favoured because the output of the extruder normally reduces with reduction of temperature of the material being extruded. The applicants have now found that the temperature at which the material is extruded is particularly important.

More specifically, in accordance with the present invention the applicants have ascertained that if the temperature of the material, when it is being extruded, is below a particular critical temperature this can enhance the strength of the resulting product.

Quite unexpectedly the applicants have found that whilst the physical strength of a blown foam generally decreases, at first, with a drop in the temperature of the material at the exit die, the relationship is not a direct one and in fact there is a temperature (hereinafter called "the critical temperature") below which the strength of the resulting foam sharply increases. With an initial drop in stock at die temperature the viscosity of the mixture in the extruder increases and the mixture is difficult to extrude using normal apparatus. If the percentage $CO_2$ is increased at the same time it has been unexpectedly found that foam sheet can be produced. However, with the initial drop in stock at die temperature the foam has a lower strength and has a greater shrinkage. The shrinkage can be as high as 30–40% of the initial dimensions of the foam. This increasing deterioration of properties was a barrier to further experimentation in this region. However, surprisingly it has been found that if the stock at die temperature is further reduced (and if the $CO_2$ concentration is simultaneously increased) that below a certain temperature the shrinkage reduces rapidly and the strength increases. This increase in strength and reduction in shrinkage occurs even if one utilises a high proportion of blowing agent. The critical temperature can readily be ascertained by a person skilled in the art for any resin/blowing agent mix by plotting the physical strength and/or shrinkage of the resultant foam against the temperature of the material at the exit die through a range of different temperatures. Below a specific temperature the applicant has found that the strength of the resultant foam sharply increases and the shrinkage rapidly reduces.

In addition the applicant has found that for foams extruded at relatively low temperatures and using a relatively high proportion of a natural gas blowing agent the density of the foam produced is not directly proportional to the molar concentration of the blowing agent. The applicants have also found contrary to conventional belief, that control of the process using relatively large amounts of blowing agent is not impaired.

Thus, in accordance with a first aspect of this invention there is provided a method of producing an extruded plastics foam of enhanced physical strength which comprises:

(a) intimately mixing a blowing agent incorporating $CO_2$ and in which the major proportion is a natural gas, in a plastics resin melt to form an homogeneous resin mix; and (b) extruding the resin mix through an exit die into a region of lower pressure.

wherein the temperature of the resin mix is adjusted so that it is below the critical temperature (as hereinbefore defined) at the point of extrusion out of the exit die.

The preferred resin is a styrene polymer. Other useful resins in the practice of the invention include other polymers which $CO_2$ will plasticize. Most preferably, the resin is a polymer or copolymer having at least 90% styrene monomers. Other monomeric units present in suitable copolymers and interpolymers include acrylic acid, acrylonitrile and other equivalents known in the art. In one embodiment, virgin polystyrene polymer (80%) is mixed with regrind polystyrene (20%). In appropriate circumstances, a nucleating agent may be incorporated into the resin mix but this is usually not necessary. At concentrations of $CO_2$ blowing agent above about 6.0% by weight, the $CO_2$ will act as its own nucleating agent. Suitable nucleating agents include sodium bicarbonate, citric acid or mixtures thereof. If a nucleating agent is used it should make up no more than about 0.2% of the weight of the resin mix. The polystyrene may be blended with an impact modifier. The melt flow index of the resin is not narrowly critical. It is preferably between 1.5 to 16 and most preferably in the range 2.0–4.0. (Reference here and throughout this specification to the melt flow index of the resin is that as tested according to Australian Standard Test Method ASTM D1238-G)

Preferably the blowing agent is 100% $CO_2$ although other natural gases such as nitrogen, air or water or mixtures of these gases can be utilised with $CO_2$. A natural gas useful in the invention is any naturally occurring atmospheric material which is a vapour at the temperature and pressure at which the foam is produced. Of course in the process of the invention the blowing agent does not need to be introduced in a gaseous state—In fact it is preferred to introduce the substance in a liquid or super critical state.

The applicants have also found that at least some of the benefits of the applicant's invention are retained if up to 50% of the amount of $CO_2$ or $CO_2$/natural gas is replaced by an equivalent molar amount of a hydrocarbon blowing agent such as butane, pentane or a hydrofluorocarbon. It is preferred that the hydrocarbon, if used, be present in a proportion of between 0.01–0.06 moles/100 g polystyrene.

The applicants have found that a convenient method of addition of a hydrocarbon blowing agent is via regrind. If the regrind is obtained from polystyrene foam previously blown with hydrocarbons, then the regrind will contain appreciable amounts of residual hydrocarbon. Levels of 2%–3% hydrocarbon weight per resin weight are quite usual. A convenient source for such regrind is packaging foam blown from polystyrene pellets using pentane or butane.

If a foam is produced in accordance with the aforementioned method an increased proportion of blowing agent can be used (so to form a foam of lower density) yet still produce a foam of enhanced strength. In fact, the utilisation of a greater amount of blowing agent brings with it important further advantages. First, if a higher proportion of blowing agent is used in the production of the foam it is possible to produce the product with a smaller cell size and in which the average thickness of the cell walls is reduced. The smaller cell size improves the appearance of the product as the smaller the cell size the smoother the surface of the end product. Furthermore, small cell size foams are of reduced brittleness as compared with foams with larger cells. Secondly, the use of a higher proportion of blowing agent enables one to extrude a resin mix through the exit die of an extrusion apparatus more easily than if a low percentage of blowing agent were used. For example in the case of a $CO_2$ blown polystyrene foam the viscosity reducing effect of $CO_2$ as previously discussed enables the invention to be worked using known commercial apparatus without substantial modification. This is because the viscosity modifying effect of the $CO_2$ counters the contrary effect on the viscosity caused by the reduced extrusion temperature.

In a preferred polystyrene/$CO_2$ blown foam utilizing 100% styrene polymer having a melt flow index of 3.5, the applicants have found that the critical temperature when measured by an infra-red probe beamed onto the material as it exits the extrusion die to be about 135° C. The temperature cited here is the temperature as measured on a Scotchtrak Heat Tracer made by the 3M company. The instrument was set for the emissivity of opaque white plastic (0.95). The IR probe was found to be consistent (within ±1° C.) with a thermocouple placed in a probe extending to the mid point of the feed line immediately preceeding the die.

The temperature of the extruded material varies significantly in various regions at or near the exit die. As the temperature of the material as it exits the die has been found to be important, it is critical that a specific location be chosen for the measurement of the temperature of the material and it is for this reason that the specific procedure outlined above is used. In this specification all reference to the temperature of the resin mix at the point of extrusion out of the exit die is the temperature as measured by an infra-red probe as described above, unless specifically stated otherwise.

Preferably the temperature of the resin mix at the point of extrusion out of the exit die is between 125° to 140° C. The most preferred temperature will depend in part on the nature of the resin used. In general, the lower the glass transition point (or the higher the Melt Flow Index) of the resin, the lower the preferred temperature. For example, with a polystyrene having a melt flow index of 3.5 (e.g. AUSTREX 112—a product of Huntsman Chemical Company Australia Limited) the temperature of the resin mix at the exit die is preferably between about 126° to 132° C. Below 125° C. the applicants have found that even with high levels of carbon dioxide addition the material is too cool to form in line. The lower limit for the temperature for polystyrene is about 120° C. at which only very simple shapes can be formed in line. For a polystyrene which has a melt flow index of 1.8 (e.g. AUSTREX 103) the temperature of the material at the exit die is preferably between 130° to 137° C. For a polystyrene which has a melt flow index of 16 (e.g. AUSTREX 555) the temperature of the material at the exit die is preferably between 124° to 130° C.

The die pressure required to avoid premature foaming for any particular grade of polystyrene increases as the concentration of $CO_2$ increases and stock at die temperature increases. In practice to avoid excessive die pressures which in turn lead to extremely difficult to control flows of foam exiting the die as the concentration of $CO_2$ is increased it is preferred to further reduce the stock at die temperature below the critical temperature. The applicants have found that using a slit die that a die pressure much in excess of 5,000 p.s.i. leads to a foam which is difficult to control.

It is preferred when using $CO_2$ that the content of the $CO_2$ be above 5.5% and below 10% (0.125–0.23 moles/100 g polystyrene) by weight to the weight of resin. At a level of 10% a stock at die temperature of about 120°–125° C. is required to avoid excessive die pressures for a polystyrene having a melt flow index of 3.5. Most preferably the $CO_2$ concentration is between 6 to 8% (0.136–0.180 moles/100 g polystyrene). Similar molar amounts are preferred if using other natural gases.

At the higher end of $CO_2$ concentration levels indicated above as preferments it has been found that the density of the foam increases leading to an extremely strong foam.

At the lower levels of blowing agent addition the resultant foam has a low density. A polystyrene foam formed using about 6% $CO_2$ has a density of between about 2 to 2.5 lbs/ft$^3$ and a cellular structure where the diameter of each of the cells is below about 0.002 inches. At a $CO_2$ addition rate of 6.5% or more the foam has a cellular structure with a cell size below 0.001 inches. This aspect of the invention brings with it further specific advantages quite apart from the enhanced physical strength of the foam brought about because of the temperature at which the product is extruded. Previous foams formed using only natural gases as blowing agents had relatively high densities resulting in large cell sizes and cell wall thicknesses. In the past it has not been possible to make foams by extrusion using a natural gas blowing agent with a microfine cellular structure. The present invention when practiced with the preferred blowing agent addition amounts referred to above enables the production of foams of enhanced strength which do not have the brittleness associated with foams having larger cell sizes. The reduced cell wall thicknesses of the foams produced in accordance with the invention result in the foams having reduced density.

An important aspect of the method of this invention is the intimate mixing of the blowing agent in the resin melt. Unless the blowing agent is intimately entrained within the resin a satisfactory foam cannot be produced. Commercial equipment for extruding foam may be used in the process of the present invention although some modification may be required to meter the blowing agent into the extruder and to ensure adequate mixing especially at higher percentages of blowing agent addition. Typically, commercial equipment comprises either a single extruder or two extruders in series (tandem extrusion). In either system, there are access points provided in the apparatus through which materials required to make the foam can be introduced. In a single extruder system, resin granules, combined in most cases with a nucleating agent, are introduced into the extruder at or near its upstream end. The resin is melted and mixed in the extruder. A blowing agent is usually introduced into the extruder at some point downstream from the point at which the resin is introduced into the molten resin.

In some systems, a blowing agent is introduced after the thermoplastic melt has passed through the extruder at a point intermediate the extruder and the outlet die in which case a further mixer is incorporated into the line to ensure proper mixing of the blowing agent in the thermoplastic melt. Tandem extrusion is a variation of this process. In tandem extrusion, the resin is melted and mixed in the first extruder. Blowing agent is then introduced into the melt prior to being introduced into a second extruder where mixing and cooling takes place. In both systems, the foam is formed by controlled release of the melt with the blowing agent entrained therein, through an exit die into a region of lower pressure. The back pressure of the die is important in this regard. As with all processes of manufacturing foam, this back pressure at the die must be sufficiently high to prevent premature foaming of the mixture as it extrudes through the die. It is also known that if the die back pressure is too low that this will lead to surface imperfections. The die back pressure can be increased by reducing the flow through the die by altering the dimension of the die. It has been found that the die back pressure as measured immediately behind the die head should preferably be above 3,500 psi. For foams with a blowing agent content of 6% of more by weight the die back pressure is preferably above 4,000 psi.

The geometry of the die and the treatment of the foam post die should be such that the foam is produced as a smooth uniform sheet at the die exit at the desired die exit temperature. In general the applicant has found that foam extruded through a slit die and passed over a bar mandrel to flatten out any waves is easier to control than foam extruded through an annular die and passed over a conical mandrel. Control of the foam will also be effected by the thickness of the die slit and other modifications obvious to those skilled in the art. Concentrations of the $CO_2$ greater than about 8% by weight are difficult to control. Control is easier if the foam is extruded into a zone of pressure intermediate that of the mixture before extrusion and atmospheric.

The take up of foam from the die is preferably such that the foam is not significantly stretched as such stretching will impart undesired mechanical distortion to the cell structure. In general, the higher the die pressure the faster the foam will emerge and the faster the take up mechanism should run. A typical take up mechanism is a forming wheel rotating so that the velocity of the circumference of the wheel is substantially equal to the speed of the exit of the foam from the die.

In most standard arrangements the apparatus includes a cooling device. This cooling device may be a cooled extruder, or part extruder, a dynamic cooler or other means known to those skilled in the art. By dynamic cooler it is meant a cooler having a rotating shaft. If used, the dynamic cooler is located at a point in the extrusion line to receive the resin/blowing agent mix after the blowing agent has been intimately entrained within the resin. The dynamic cooler includes means to continue the admixture of the resin and blowing agent while simultaneously reducing its temperature.

For the process of the present invention, the temperature of the resin mix is preferably adjusted to a temperature below the critical temperature by means of a dynamic cooler.

An unexpected advantage of the present invention is the suitability of existing apparatus to make the preferred foams. A $CO_2$ blown polystyrene foam is formed both conventionally and in the process of the present invention by incorporating carbon dioxide into the polystyrene melt at a temperature broadly in the range of between 170° C. to 230° C. After the blowing agent has been intimately entrained within the resin melt it is cooled to the appropriate temperature for extrusion out of the exit die. In a polystyrene foam comprising for example 3.5% $CO_2$ the conventional apparatus will reduce the temperature of the melt through the dynamic cooler to about 155° C. When exercising the preferred embodiment of this invention (which involves the use of a higher percentage of carbon dioxide) the dynamic cooler will operate to bring about a greater drop in the temperature of the mix. This is because of the viscosity modifying effect of the carbon dioxide. The greater percentage addition of carbon dioxide, the less viscous the resin mix and this means that there is less shear heating when the mix is passed through the dynamic cooler. The applicants have found that on conventional apparatus the critical temperature for polystyrene/$CO_2$ foam of about 135° C. can be achieved through unmodified dynamic cooling apparatus simply by increasing the $CO_2$ addition rate to about 5.5% by weight.

The foams produced by the aforementioned methods have characteristics of strength/smoothness and lack of brittleness not previously known in an extruded plastics foam.

Thus, in accordance with a further aspect of the invention there is provided an extruded polystyrene foam sheet incorporating a cellular structure in which the average cell diameter is less than 0.002 inches and which has a density of less than about 4.0 lbs/ft$^3$.

Most preferably the foam sheet has a density of between 2.0 to 3.0 lbs/ft$^3$. The average cell diameter is most preferably less than 0.001 inches. The cell structure is preferably closed. The average cell wall thickness is between 1 to 2 microns (0.00004–0.0008 inches) and most preferably between 1 to 1.5 microns.

BRIEF DESCRIPTION OF THE DRAWING FIGURES

The invention is hereinafter described by reference to the preferred embodiment in which.

DETAILED DESCRIPTION OF THE PREFERRED EMBODIMENT

Figure 1:
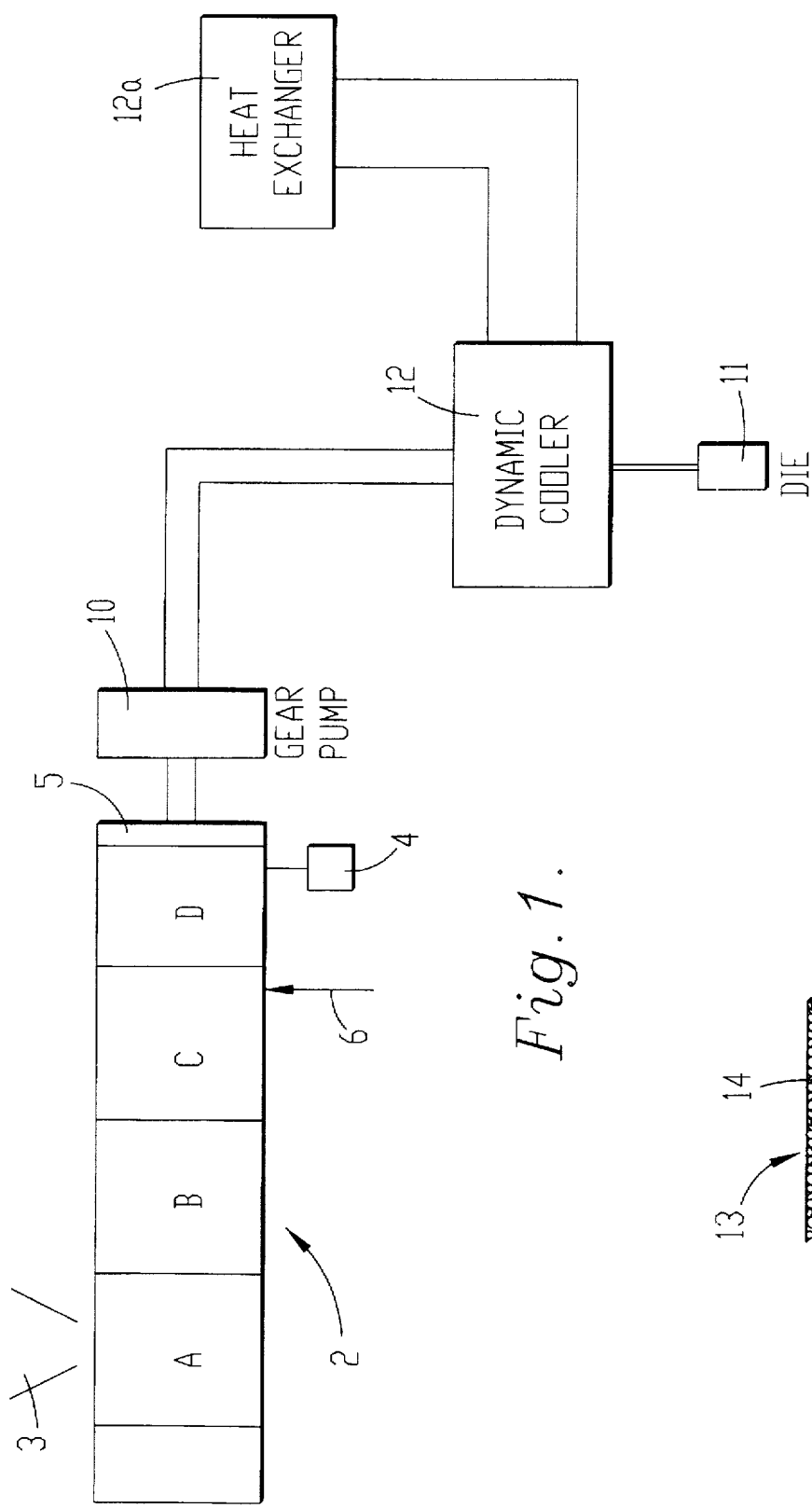
FIG. 1 is a schematic diagram of a single extruder extrusion system for practicing the current invention.

Polystyrene foam made substantially entirely by virgin and regrind polystyrene and $CO_2$ is prepared on a single extrusion line as shown in FIG. 1.

Resin granules are introduced into the upstream end of extruder 2 through hopper 3. The resin may be mixed with a nucleating agent such as sodium bicarbonate, citric acid, hydrocerol, talc or any other nucleating agent as known in the art. The addition rate of nucleator in the practice of the present invention is in the range of 0% to 1% and preferably between 0% to 0.1%. Regrind material previously extruded with $CO_2$ can be added to the resin granules in a ratio preferably between 10 to 40%. A screw extruder rotates within the barrel of extruder 2. The barrel is maintained at a temperature between 170° to 180° C. to melt the polystyrene and enable it to move easily along the barrel. The extruder 2 has four separate zones designated A, B, C and D in FIG. 1. The polystyrene resin is melted in zones A, B and C and the barrel is maintained at a pressure of between 3500 to 4500 psi. The pressure in the extruder barrel 2 is checked by a transducer 4 fitted before a screen changer 5.

$CO_2$ is metered and introduced into the polystyrene melt at access point 6 at the end of zone C. The carbon dioxide is added to the polystyrene at a rate of above 5.5% consumption by weight compared with the weight of extruded polystyrene. The $CO_2$ is preferably injected as a liquid at a pressure higher than the pressure within the extruder barrel 2, most preferably at around 5000 psi.

The resin and the $CO_2$ are intimately mixed in zone D of extruder barrel 2. To ensure adequate mixing in this region the applicants have developed a mixing tip 7 which is fitted at the end of the screw in zone D. Mixing tip 7 is shown in more detail in FIG. 3. It will be noted that the mixing tip comprises a high density of fixed mixing pegs 8 and an expanded mixing tip head 9 such that the clearance between the outermost edge of the mixing tip head 9 and the inner wall of the extruder barrel 2 is about 1.4 mil or less. These modifications to the mixing tip head or similar such modifications are necessary to ensure adequate mixing of the higher proportion of the blowing agent within the resin. An alternative arrangement has been previously disclosed in the applicant's U.S. Pat. No. 5,129,728. The applicants have found that it is important that there is no dead space in the line between where the gas is added to where the mixture is extruded through the die. The mixture should be continuously worked.

The resin with the $CO_2$ intimately entrained therein after being mixed thoroughly in the extruder passes through the screen changer 5 to gear pump 10. Gear pump 10 is operated at an appropriate rate having regard to the rate of foam output at die 11 and the rate of resin production through extruder 2 to balance the pressures on either side of the gear pump. The pressure variation after gear pump 10 is preferably less than 300 psi. Greater variations can cause fluctuation of sheet at the die 11.

The well mixed material is then fed into the dynamic cooler 12 preferably at a pressure above 4000 psi. The dynamic cooler 12 can be of any type as known in the art. Preferably it is a cooler having a rotating shaft with gears and the geared teeth carry small amounts of material allowing the $CO_2$/resin mix to cool down to the desired temperature. The heat exchanger 12a is used to cool the dynamic cooler body and shaft. Oil temperature cooling the cooler depends on the cooler output. This oil temperature can be in a range of between 45° to 100° C. Preferably the resin mix is cooled to a temperature of about 130° C. Once the $CO_2$/resin mix has been cooled down it is extruded out of die 11 and is permitted to expand into a foam by passage into a region of lower pressure. The pressure at the die is preferably about 4000 psi.

The sheet so formed can be used in a continuous process to form products immediately after it exits the die or the foam can be used at a later time to thermoform products. Foams made in accordance with the aforementioned method have low expansion on reheating. Therefore conventional foam re-heat thermoforming apparatus needs to be modified for use with such foams. It is preferred to form the foam so produced while it is still hot after exiting the die on a continuous vacuum assist or plug assist thermoformer of conventional design.

Whilst the preferred method described above is detailed by reference to a specific type of extruder apparatus, foam produced in accordance with this invention may be made on any equipment capable of making conventional coarse foam sheet using 100% natural gas blowing agent at an exit die temperature of between 140° to 155° C. provided that the equipment has adequate mixing capability so to intimately entrain the higher proportion of natural gas blowing agent used in the preferred embodiments of this invention.

When the equipment is running smoothly at for instance 145° C. making good foam, to make foams of the present invention, the temperature is decreased and preferably the natural gas concentration simultaneously increased keeping the viscosity of the cooled molten mixture roughly the same. Viscosity can be monitored from the torque on the cooling screw or dynamic cooler.

Figure 3:
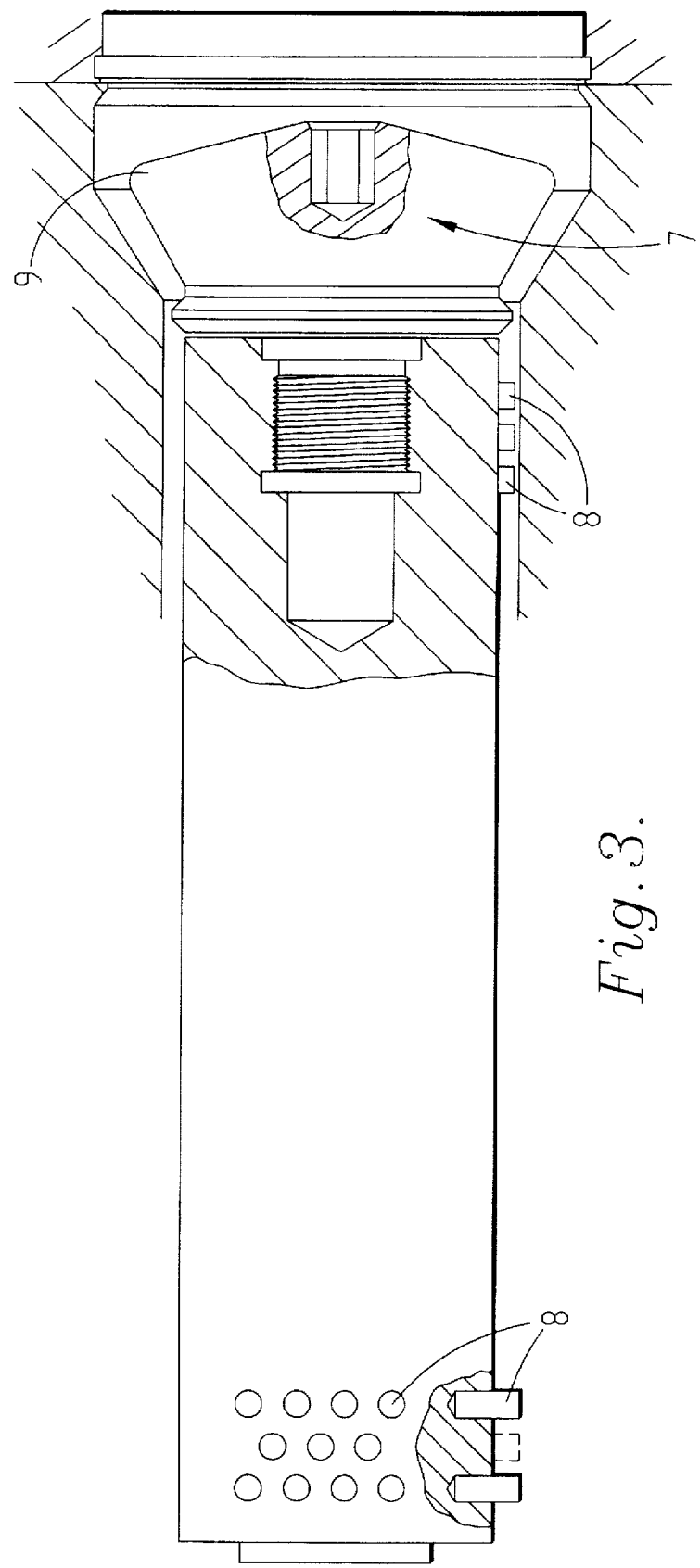
FIG. 3 is a cross-sectional view of the mixing tip in the extruder shown in FIG. 1.

If there is excessive fluctuation of pressure occurring as the blowing agent concentration is increased (or if bubbles of gas start popping from the die) then there is not adequate mixing and the equipment must be modified (such as shown by the incorporation of a modified mixing tip as shown in FIG. 3) to increase mixing capability.

Assuming adequate mixing capability the cell size reduces to a microfine cellular structure as detailed by reference to FIG. 2. It will be seen that the foam 13 has a microfine cellular structure wherein each cell 14 has a maximum diameter of about 0.001 inches and the average cell wall thickness is between 1 to 2 microns. The temperature at the point of extrusion out of the exit die may be reduced to the lowest temperature that the foam sheet can be either thermoformed or otherwise manipulated. Depending on the nature of the post forming operation, this temperature will be somewhere in the region between 120° to 127° C. for polystyrene with a melt flow index of between 2 to 4.

Figure 2:
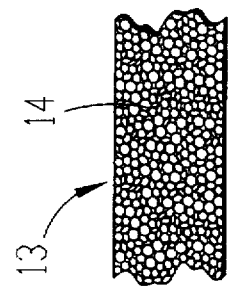
FIG. 2 is a schematic representation of the cross-sectional view of a foam sheet made in accordance with the invention.

The preferred foam produced by the process described by reference to FIGS. 1 and 3 above has a microfine cellular structure as can be seen in FIG. 2. The physical characteristics of the foam are as follows: density: 2.0–2.2 lbs/ft$^3$ average cell size: less than 0.001 inch average cell wall thickness: 1 to 2 microns.

In order to assess the influence of the temperature of the resin mix at the point of extrusion out of the exit die the applicant conducted a number of trials using the same apparatus, polystyrene having the same melt index and using exclusively $CO_2$ as the blowing agent. In each case, the polystyrene grade used was AUSTREX 112 having a melt flow index of 3.5 and the $CO_2$ was food grade. The foam produced in each trial was formed into a meat tray (7 inch×5 inch×5/10 inch deep) using a continuous vacuum former and the side strength of the tray was tested.

The strength test involved placing the formed foam tray flat on a jig and measuring the maximum force that the side wall of the tray could withstand before it would collapse. The results of this test for foams produced over a range of different exit die temperatures are set out in the table reproduced in Table 1 below.

A second series of tests were conducted using AUSTREX 112 resin in which the average cell size was also measured. The results of these tests are shown in Table 2.

TABLE 1

| Trial | Temperature of Resin Mix at Exit Die °C. (see Note 1) | Density (lbs/ft$^3$) | Cell Size (0.001") | % $CO_2$ Addition (See Note 2) | Side Strength | Tray Weight(g) | Strength(N)/ Weight(g) |
|---|---|---|---|---|---|---|---|
| 1 | 155* | 4.03 | 18–15 | 3.4* | 20.7 | 6.35 | 3.3 |
| 2 | 150* | 3.39 | 12–16 | 3.7* | 18.6 | 5.84 | 3.2 |
| 3 | 148 | 2.60 | 6–12 | 5.0 | 19 | 5.09 | 3.73 |
| 4 | 147 | 2.40 | 5–6 | 5.2 | 17 | 4.97 | 3.42 |
| 5 | 147 | 2.59 | 10–12 | 5.5 | 18 | 4.92 | 3.65 |
| 6 | 146 | 2.49 | 7–9 | 5.5 | 15 | 5.14 | 2.91 |
| 7 | 145 | 2.41 | 4–5 | 5.5 | 18 | 4.88 | 3.68 |
| 8 | 144* | 2.70 | 8–10 | 4.6* | 13.6 | 4.52 | 3.01 |
| 9 | 142 | 2.34 | 3–4 | 6.6 | 18 | 4.60 | 3.91 |
| 10 | 142 | 2.29 | 2–3 | 6.4 | 18 | 4.82 | 3.73 |
| 11 | 141 | 2.06 | 3–3 | 6.9 | 17 | 4.58 | 3.71 |
| 12 | 137 | 2.15 | 1–2 | 6.1 | 16 | 4.55 | 3.51 |
| 13 | 137 | 2.11 | 1–1 | 6.2 | 14 | 4.01 | 3.49 |
| 14 | 136 | 2.29 | 1–1 | 6.5 | 18 | 4.25 | 4.23 |
| 15 | 135* | 2.24 | 1–2 | 5.8* | 13.7 | 3.90 | 3.51 |
| 16 | 134 | 2.01 | 1–1 | 7.7 | 20 | 4.24 | 4.71 |
| 17 | 134 | 2.20 | 1–1 | 6.4 | 23 | 4.53 | 5.07 |
| 18 | 132 | 2.13 | 1–1 | 6.5 | 20 | 4.05 | 4.93 |
| 19 | 131 | 2.21 | 1–1 | 6.8 | 28 | 4.25 | 6.58 |
| 20 | 128* | 2.39 | 1–1 | 6.6* | 19.5 | 3.92 | 4.97 |
| 21 | 127 | 2.23 | 1–1 | 7.4 | 15 | 3.03 | 4.95 |

Note 1:
The temperatures marked with an asterisk were measured using an IR Probe beamed onto the material as it exited the die. All other temperatures are those as measured adjacent to and immediately before the exit die with a thermocouple.
Note 2:
The $CO_2$ percentage addition for those figures marked with an asterisk is as measured by using a single tank of $CO_2$ placed on a weighing scale. The total bottle weight was recorded every hour for 3 hours during the operation of the extruder making trays to the specific specification of the trial. The mass of trays produced per hour was compared with the consumption of $CO_2$ by mass each hour and averaged over the 3 hour period of the trial.
Those figures without any markings were measured by reference to the volume of gas injected into the extruder by the guage on the apparatus. The applicant believes these figures to be less reliable with a variation of about ±1.0%.

TABLE 2

| Trial | Temperature of Resin Mix at Exit Die °C. | Average Cell Size (Micron) | Average Cell Wall Thickness (Micron) | % $CO_2$ Addition | Strength(N)/ Weight(g) |
|---|---|---|---|---|---|
| 1 | 124 | 13.4<br>12.3 | 1–1.5 | 6.8 | 4.9 |
| 2 | 126 | 12.0<br>13.0 | 1–1.5 | 6.8 | 4.9 |
| 3 | 122 | 11.5<br>11.1 | 1–1.5 | 8.2 | 5.05 |
| 4 | 127 | 13.9<br>13.5 | 1–2 | 6.8 | 4.5 |
| 5 | 130 | 15.0 | 1–2 | 6.8 | 4.3 |

TABLE 2-continued

| Trial | Temperature of Resin Mix at Exit Die °C. | Average Cell Size (Micron) | Average Cell Wall Thickness (Micron) | % CO₂ Addition | Strength(N)/ Weight(g) |
|---|---|---|---|---|---|
| 6 | 129 | 12.2 14.0 15.0 | 1–2 | 6.8 | 4.7 |
| 7 | 128 | 21.0 20.0 | 1–2 | 6.3 | 4.3 |
| 8 | 130 | 21.0 20.0 | 1–2 | 6.3 | 4.2 |
| 9 | 132 | 23.9 21.1 | 1–2 | 6.0 | 4.0 |
| 10 | 134 | 17.9 20.3 | 1–2 | 5.5 | 3.6 |
| 11 | 137 | 64.5 46.7 | 2–3 | 4.77 | 3.0 |
| 12 | 139 | 204.4 183.5 | 10–12 | 4.9 | 3.7 |

As can be seen from the above test results for polystyrene/ $CO_2$ mixes the resultant foam is of reduced strength with a decrease in the die temperature to about 135° C. whereafter further reduction in the temperature of the material as it exits the die results in a quite significant increase in the physical strength of the foam produced. In particular, it is to be noted from the trials shown in Table 1 that the side strength of the foams produced at temperatures between 131° to 134° C. were all 20 newtons or greater which is substantially the same or better than the side strength of the trays produced from a foam having a much higher density such as those in trials 1, 2 and 3.

At lower exit die temperatures it is possible to incorporate higher levels of $CO_2$ and thus produce foams of lower density yet having enhanced side strength.

The sharp increase in the strength to weight ratio for temperatures below 135° C. indicates that for this resin/gas mixture, the critical temperature is about 135° C.

It will be noted that the side strength of the material extruded at 128° C. is greater than the side strength of the material extruded at 150° C. notwithstanding that the density of the material is some 30% less than the material which was extruded at 150° C.

A third series of tests were conducted by the applicant using a polystyrene resin having a higher melt flow index. For this series of tests, the applicant used Austrex 555 resin which has a melt flow index of 16. Line conditions for the production of a foam tray were set so to be substantially the same as in previous trials using Austrex 112 resin. $CO_2$ addition was at 6.8%. Good trays were produced at a stock at die temperature below 130° C. The optimum temperature appeared to be about 128° C. at which the foam trays produced were found to have a density of 2.11 lbs/ft³ and the foam was found to have a microfine structure having a cell size of less than 0.001 inch.

Whilst the sheet quality was found to very slightly deteriorate using a resin having such a high melt flow index, the trays formed were found to have similar properties to those made with a styrene having a much lower melt flow index such as Austrex 112.

The present invention provides many flow on benefits. Any grade of polystyrene can be used because the viscosity of the material can be lowered by use of a higher percentage carbon dioxide. This reduces the stress on the equipment. A foam sheet can be made having lower density without sacrificing tensile properties. It is possible to achieve microfine cellular structure and this has advantages of smoothness, reduced brittleness and enhanced insulation properties. In addition microfine cell foams allow increased extruder output due to reduced material viscosity as a result of the higher $CO_2$ content. This enables equipment to run faster with low stress.

Finally microfine call foams are flexible.

To produce the foams of the present invention on conventional apparatus it was necessary for the applicants to recognize the viscosity modifying effect of $CO_2$ and to increase the proportion of blowing agent and make a lower density foam so to permit extrusion below the critical temperature. The reduction of the materials density to thereby enhance strength was counter-intuitive but lead to a superior product having several advantages as detailed above.

It will be understood that the abovementioned preferred description of the process of the invention may be modified (for example by incorporating additional mixing by a way of a tandem extrusion system) or by the incorporation of additional materials (such as nucleating agents) without departing from the spirit and scope of the invention.

I claim:

1. A method of producing a polystyrene foam article of enhanced physical strength in which the article is thermo-formed from an extruded polystyrene foam, said method comprising the steps of:
   (a) intimately mixing a blowing agent consisting essentially of a natural gas or gases in a polystyrene melt to form an homogeneous resin mix, said blowing agent containing between 5.5% to 10% by weight $CO_2$ to the weight of the resin;
   (b) extruding the resin mix through an exit die into a region of lower pressure while maintaining the temperature of the resin mix below the critical temperature at the point of extrusion out of the exit die to form a polystyrene foam sheet; and
   (c) thermoforming said polystyrene sheet without reheating the sheet so as to form an article immediately after extrusion of the resin mix through the exit die.

2. A method as recited in claim 1 wherein said blowing agent includes $CO_2$ mixed with another natural gas.

3. A method as recited in claim 2 wherein said blowing agent includes $CO_2$ mixed with nitrogen.

4. A method as recited in claim 3, wherein said blowing agent consists exclusively of $CO_2$ and nitrogen.

5. A method as recited in claim 1, wherein said blowing agent includes between 0.01–0.06 moles/100 g resin of any one or more of pentane, butane or a hydro-fluorocarbon and wherein the remainder of the blowing agent is $CO_2$.

6. A method as recited in claim 1, wherein said blowing agent is exclusively $CO_2$.

7. A method as recited in any of claims 1 and 2–6, wherein polystyrene melt includes virgin polystyrene polymer and regrind polystyrene polymer.

8. A method as recited in any of claims 1 and 2–6, wherein the regrind polystyrene is reground foam blown with a hydrocarbon blowing agent.

9. A method as recited in claim 1, wherein the plastics resin is a styrene polymer having a melt flow index of between 2 to 4 and the blowing agent is exclusively $CO_2$, the critical temperature of the resin mix at the point of extrusion out of the exit die being about 135° C. as measured by an infrared probe beamed onto the material as it exits the extrusion die.

10. A method as recited in claim 9, wherein the temperature of the resin mix at the point of extrusion out of the exit die is between 125° C. to 135° C.

11. A method as recited in claim 10, wherein the temperature of the resin mix at the point of extrusion out of the exit die is about 128° C.

12. A method as recited in claim 1, wherein the plastics resin is a styrene polymer having a melt flow index of between 1.5 to 2 and the blowing agent is exclusively $CO_2$, the critical temperature of the resin mix at the point of extrusion out of the exit die being about 140° C. as measured by an infrared probe beamed onto the material as it exits the extrusion die.

13. A method as recited in any of claims 1 and 2–6, wherein the blowing agent contains between 6 to 8% by weight $CO_2$ to the weight of the resin.

14. A method as recited in claim 1, wherein the resin mix is maintained at a pressure of between 3,500 to 5,000 psi immediately prior to extrusion through the exit die and is permitted to expand into a foam by passage into a region maintained at atmospheric pressure.

15. A method as recited in claim 1, wherein a nucleating agent is added to the resin prior to incorporation with a blowing agent; said nucleating agent being present in the amount of no more than 0.2% by weight of the resin mix.

16. A method as recited in claim 15, wherein said nucleating agent is sodium bicarbonate, citric acid, talc or mixtures thereof.

17. A method as recited in claim 1, wherein the blowing agent is intimately mixed with the plastics resin melt in a screw extruder and wherein the temperature of the resin mix is reduced to below the critical temperature by a dynamic cooler which is adapted to reduce the temperature of the mix while simultaneously maintaining a homogeneous mix of the resin and blowing agent.

18. A method as recited in any of claims 1 and 2–6 wherein the resin mix is extruded through a slit die and is passed over a bar mandrel.

19. A method as recited in claim 1, wherein the extruded polystyrene foam is thermoformed into an article at atmospheric pressure immediately after the extrusion of the foam out of the exit die.

* * * * *